United States Patent
Herder

(10) Patent No.: US 7,176,789 B2
(45) Date of Patent: Feb. 13, 2007

(54) METHOD FOR MEASURING DISTANCE AND MEASURING DEVICE FOR IT

(75) Inventor: Bjoern Herder, Falkensee (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 10/943,526

(22) Filed: Sep. 17, 2004

(65) Prior Publication Data

US 2005/0088334 A1    Apr. 28, 2005

(30) Foreign Application Priority Data

Sep. 18, 2003  (DE) ............................... 103 43 175

(51) Int. Cl.
*B60Q 1/00*     (2006.01)
(52) U.S. Cl. .................. 340/435; 340/436; 340/438; 340/439; 340/825.72; 340/903; 342/70; 342/118
(58) Field of Classification Search ............. 340/435, 340/436, 438, 439, 903, 932.2, 825.72; 342/70, 342/116, 118, 137; 180/167, 169; 367/99, 367/118
See application file for complete search history.

(56) References Cited

U.S. PATENT DOCUMENTS

| | | | | |
|---|---|---|---|---|
| 5,471,215 | A * | 11/1995 | Fukuhara et al. ............. | 342/70 |
| 6,259,515 | B1 * | 7/2001 | Benz et al. ................. | 356/5.08 |
| 6,490,226 | B2 * | 12/2002 | Asakura et al. ............... | 367/97 |
| 6,784,808 | B2 * | 8/2004 | Hoetzel et al. .......... | 340/932.2 |
| 2003/0222778 | A1 | 12/2003 | Piesinger | |
| 2005/0052950 | A1 * | 3/2005 | Klinnert et al. | |

FOREIGN PATENT DOCUMENTS

| | | |
|---|---|---|
| DE | 197 11 467 | 10/1998 |
| DE | 198 02 724 | 7/1999 |
| DE | 100 49 906 | 4/2002 |
| EP | 1 058 126 | 12/2000 |
| WO | WO02/095443 | 11/2002 |
| WO | WO03/081278 | 2/2003 |
| WO | WO03/016941 | 10/2003 |

* cited by examiner

*Primary Examiner*—Hung Nguyen
(74) *Attorney, Agent, or Firm*—Kenyon & Kenyon LLP

(57) ABSTRACT

A method for distance measuring using at least two contactless distance sensors, e.g., ultrasound sensors, is provided, which distance sensors each have one emitter for emitting measuring pulses (MI) and one receptor for receiving measuring pulse echos (ME). The distance from an obstacle that reflects the measuring pulse (MI) is determined from the time difference between the measuring pulse (MI) and the received measuring pulse echo (ME). A first measurement is performed, which involves alternatingly emitting by the at least two distance sensors the measuring pulses (MI) offset in time by a first offset, and subsequently receiving the measuring pulse echos (ME) by the distance sensors. In addition, a verification measurement is performed, which involves alternatingly emitting by the at least two distance sensors the measuring pulses (MI) offset in time by a second offset, which is different from the first offset in time used in the first measurement.

15 Claims, 6 Drawing Sheets

METHOD FOR MEASURING DISTANCE AND MEASURING DEVICE FOR IT

FIELD OF THE INVENTION

The present invention relates to a method for measuring a distance using at least two distance sensors that are not in contact.

BACKGROUND INFORMATION

In a method for measuring distances using ultrasound sensors, which respectively have an emitter for transmitting measuring pulses and a receptor for receiving measuring pulse echos, the distance from an obstacle that reflects the measuring pulse is determined from the time difference between the measuring pulse and the reflected measuring pulse echo. This method may be implemented using a measuring device including: a) at least two ultrasound sensors which each have an emitter for transmitting measuring pulses and a receptor for receiving measuring pulse echos; b) a control unit; and c) an evaluation unit connected to the distance sensors.

The corresponding measurements of distance may be used for parking-assistance functions in motor vehicles, e.g., in order to detect obstacles in the surroundings of the vehicle, such as in front of, or behind, the vehicle, and to indicate the existence of these obstacles optically and/or acoustically. For this purpose, the ultrasound sensors emit a measuring signal, and the running time is measured until the measuring signal echo reflected from the obstacle arrives again at the receptor of the distance sensor. The running time is then recalculated into a distance. The driver is informed about the distance between the vehicle and the obstacle, whereby several advantages may be derived, e.g., more convenient parking and maneuvering, utilization of tighter parking spaces even for unpracticed drivers, and the avoidance of parking accidents.

Conventionally, after an obstacle is detected, the measurement is repeated at an interval that is as short as possible, in order to verify the result. However, in this context, one needs to consider that the adjacent distance sensors to the transmitting distance sensor are also used as receptors, which means reflecting measuring pulse echos may be derived from a wider spatial region. The measuring pulse echos received are designated as direct echos if a distance sensor receives again a measuring pulse that it transmitted itself, i.e., by direct reflection. However, in addition, cross echos may be observed which are measuring pulses of immediately adjacent distance sensors received by a given distance sensor as a result of cross reflection. If several distance sensors emit pulses substantially simultaneously, cross feed echos also appear under certain circumstances, which are cross-reflected measuring pulses received by a distance sensor, and which originate from another distance sensor than the receiving distance sensor or from the distance sensors directly adjacent to the receiving distance sensor.

Now, in order to prevent mutual interferences of the distance sensors and to be able to match the received measuring pulse echos to individual emitters of the distance sensors, not all distance sensors may emit at the same time. In the case of the four to six distance sensors usually used per vehicle side, e.g., in the case of six distance sensors in the front region of the vehicle, the reaction time is increased disadvantageously by the sequential distance measurement of the individual distance sensors, i.e., the measurements are staggered in time. In an attempt to overcome this shortcoming, emitting groups may be used, within which group up to two distance sensors emit simultaneously. Between the two emitters of a given emitting group, there are three other distance sensors of other emitting groups, for example, in order to ensure the correct matching of the received measuring pulse echos.

In the case of greater measuring ranges, there is additionally the danger that interference, so-called cross feed, may appear within the emitting groups which are arranged for short measuring ranges. Therefore, it is necessary in conventional approaches to limit the measuring range or to emit the measuring pulses sequentially by the distance sensor, which has a negative influence on the reaction time of the measuring system.

In FIG. 4, a conventional method for providing parking assistance in motor vehicles is shown in detail. In FIG. 4, the front end 3 of a motor vehicle is shown with six distance sensors $4_1$, $4_2$, $4_3$, $4_4$, $4_5$ and $4_6$, which may be, e.g., built into the bumper of the motor vehicle. In the conventional method shown, distance sensors 4 are operated in parallel in emission groups, i.e., measuring pulses MI of the individual emission groups are emitted substantially simultaneously. The lines that have bidirectional arrows show, in this case, direct reflection echos D, i.e., measuring pulse echos ME, which are emitted by an emitter of a distance sensor 4 and received again by the receptor of the same distance sensor 4 after direct reflection at an obstacle 7.

On the other hand, the lines having arrows directed one way represent cross reflection echos K, which are received as measuring pulses MI of a first distance sensor 4 after reflection by obstacle 7 or, in an exceptional case, possibly also by direct cross feed from the receptor of another distance sensor 4.

In FIG. 4, it may be seen that the emission group including distance sensors $4_1$ and $4_5$ simultaneously emit measuring pulses MI. These distance sensors $4_1$, $4_5$ then measure measuring pulse echos ME as direct reflection echos D. Distance sensor $4_2$, which is adjacent to emitting distance sensor $4_1$, also receives a direct cross reflection echo K. In a similar manner, distance sensors $4_4$ and $4_6$, which are adjacent to emitting distance sensor $4_5$, receive direct cross reflection echos K of measuring pulses MI emitted by distance sensor $4_5$.

Since it is known that only distance sensors $4_1$ and $4_5$, which are far apart from each other, emit actively at the same time, it may be ensured that no cross feed between the two emitting distance sensors $4_1$ and $4_5$ takes place.

Subsequently, the emission group including distance sensors $4_2$ and $4_6$ is activated. Here too, the distance between the emitting distance sensors $4_2$ and $4_6$ is sufficiently great that cross feed does not take place.

For the subsequent activation of distance sensor $4_3$, however, it cannot be ensured that there is a sufficient distance from another distance sensor 4 that could also possibly be activated at the same time. Therefore, distance sensor $4_3$ is operated by itself. The same applies to the subsequent activation of distance sensor $4_4$.

In FIG. 5, a conventional distance measurement using emission groups involving four distance sensors $4_1$, $4_2$, $4_3$ and $4_4$ is shown, along with the direct reflection echos D and the cross reflection echos K. On account of the distances of distance sensors 4 from one another, cross feed can not be completely excluded, so that distance sensors $4_1$, $4_2$, $4_3$ and $4_4$ are activated individually (in sequence) for the first measurement and the verification measurement, respectively. Consequently, in the case of the first measurement E and the verification measurement V, in each case only a single distance sensor 4 is emitting. This disadvantageously results in a relatively great reaction time.

If now, as shown in FIG. 6, distance sensors 4, which are relatively close to one another, simultaneously emit measuring pulses MI, then, in the case of a lateral obstacle 7, cross reflection echos K may come about, thereby causing potential misinterpretations.

Measurement pulse echos ME received by distance sensor $4_3$ are conventionally interpreted as being assigned to directly adjacent emitting distance sensor $4_4$. By doing this, a pseudo-obstacle 8 is detected which, in actuality, does not exist. Instead, distance sensor $4_3$ has merely received a cross reflection echo K from distance sensor $4_1$ that is also emitting, which, with reference to emitting distance sensor $4_4$, represents a cross feed echo. Accordingly, it may be seen that the emitting groups may not lie too close together, if a reliable distance measurement (e.g., for parking assistance) is to be implemented.

FIGS. 7 and 8 illustrate situations in connection with the conventional distance-measuring method, in which cross feed takes place within emitting groups when the measuring range is too great. The actual obstacle 7 is correctly detected by emitting distance sensor $4_1$ from direct reflection echo D. Based on the great measuring range, measuring pulse MI emitted by distance sensor $4_1$ is reflected by obstacle 7 right up to distance sensor $4_5$, as shown in FIG. 7, or to distance sensor $4_4$, as shown in FIG. 8. Since, in addition, distance sensor 4. (in FIG. 7) is active, and it emits measuring pulses MI, cross feeding, cross reflection echo K resulting from distance sensor $4_1$ is interpreted by distance sensor $4_5$ as a direct reflection echo D, and an actually nonexistent pseudo-obstacle 8 is detected (in FIG. 7).

Similarly, as shown in FIG. 8, cross feeding, cross reflection echo K, which results from measuring pulse MI of distance sensor $4_1$, may be interpreted by distance sensor $4_4$ as a direct cross reflection echo K of distance sensor $4_5$, which also leads to an erroneous detection of an actually nonexistent pseudo-obstacle 8.

FIG. 9 illustrates a limitation of measuring range R in connection with distance sensors 4 positioned at the front end of a motor vehicle. If the measuring range of the outer distance sensors, such as distance sensor $4_5$, is limited with respect to the vehicle, cross feeding, cross reflection echos K having a longer running time may be excluded as being erroneous signals. However, the limitation of measuring range R has the disadvantage that obstacles are detected too late under certain circumstances.

SUMMARY

An example method according to the present invention includes the steps of: a) emitting measuring pulses alternatingly, offset in time, by the at least two distance sensors for a first measurement; b) receiving the measuring pulse echos by the distance sensors; and c) providing a repeated emission, offset in time, of measuring pulses for a verification measurement, using a changed offset in time compared to the first measurement.

Because of the mutually time-offset emission of measuring pulses of the distance sensors of an emission group, an artificial running time difference between the first measurement and the verification measurement (or repeat measurement) is superposed on the cross feed echos within the emission group. Because of this running time difference of the measuring pulse echos between the two measurements, the cross feed echos may then be filtered out. This provides the additional advantage that the measuring range is able to be increased, since a misinterpretation of the measuring receiving signal is prevented. In the case of emission offset in time, those running times of the directly reflected measuring pulse echos and of the direct cross echos which originate from the distance sensors directly adjacent to the receiving distance sensor are maintained. The running times of the cross-reflecting, cross-feeding measuring impulses (cross feed echos), which originate from distance sensors other than the receiving distance sensor or the distance sensor directly adjacent to the receiving distance sensor, are different and are able to be filtered out. Therefore, it is no longer necessary that two different, simultaneously emitting sensors of a given emitting group are separated by at least three sensors of different emitting group sensors. This provides the advantage that, at the front end and the rear end of a motor vehicle, respectively, for example, one emitting group may be saved, and the reaction time of the distance measuring system may be improved.

In accordance with the present invention, the control unit and the evaluation unit of the distance measuring system may be implemented by a programmable on-board computer of a motor vehicle.

The offset in time may amount to only a fraction of the time which a distance sensor requires to make a distance measurement. The reaction time of the system is consequently not impaired by the offset in time, thereby allowing the distance sensors to carry out their measurements substantially faster than the existing measuring systems.

The changed offset in time may be such that the sequence of the emissions of the measuring pulses by the distance sensors during the verification measurement is the reverse of the sequence during the first measurement. However, the changed offset in time may also be such that the offset time between successive emissions of measuring pulses for the verification measurement is different from the offset time for the first measurement. The offset time between the emission offset in time of successive measuring pulses is selected to be a function of the time duration between the first measurement and the verification measurement. In this context, it should be noted that, because of the offset in time, a greater artificial displacement in time has to be superposed onto the cross-feed echo than a real obstacle could have traveled relative to the distance sensor in the corresponding time, e.g., by the movement of the motor vehicle.

For distance measurement in motor vehicles, e.g., for parking assistance, the offset in time should therefore be selected as a function of the vehicle's speed in such a way that the cross-feed measuring pulses received by the distance sensors by indirect cross reflection, i.e., reflections of pulses which were in each case emitted by the emitters of a different distance sensor than the received distance sensor or the distance sensors directly adjacent to the received distance sensor, do not fall into the tolerance of receiving time range for measuring pulses received by the distance sensors by direct reflection or direct cross-reflection, i.e., reflections of pulses which were emitted respectively by the distance sensor's own emitter or that of the directly adjacent distance sensor.

The received measuring signals of the same distance sensor from the first measurement and the verification measurement are correlated in order to ascertain the measuring pulses received by direct reflection and direct cross-reflection, and to filter out the cross-feed echos.

For this purpose, the running times of the received measuring pulses of the same distance sensor from the first measurement and the verification measurement are ascertained, and a comparison of the ascertained running times of the received measuring pulses in the first measurement and the verification measurement is performed. The distance to an obstacle is then determined from the running times that fall within a predetermined tolerance of the receiving time range.

Because of the offset in time, the running times of the cross feed echos are completely different, since the time offset still becomes superposed onto the running time of the cross-feed echos. If the offset in time is chosen to be greater than the tolerance of reception time range, the cross-feed echos may then be easily detected as such because of the different running times, since, when comparing the received measuring signals from the first measurement and the verification measurement, they do not lie in the same time window which is stipulated by the tolerance of the receiving time range.

DETAILED DESCRIPTION

Figure 1:
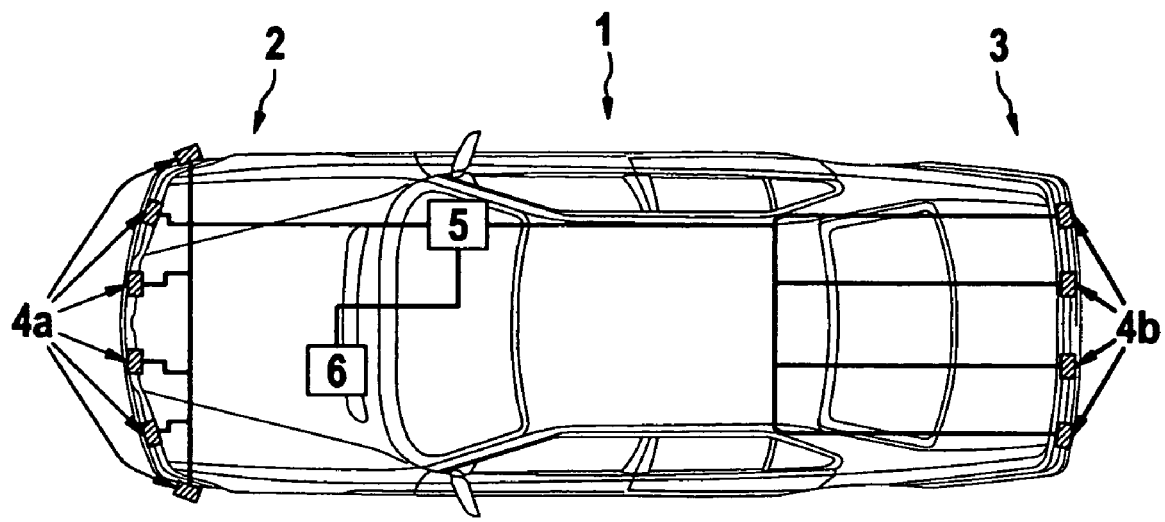
FIG. 1 shows a top view of a motor vehicle having distance sensors at the front end and rear end.

In FIG. 1, a top view of a motor vehicle 1 is shown. At the front end 2 and at the rear end 3, a plurality of distance (e.g., ultrasound sensors) sensors 4 (4a designating the sensors in the front, and 4b designating the sensors in the rear) are built into the bumper, each of which sensors has an emitter for emitting measuring pulses MI and a receptor for receiving measuring pulse echos ME. Distance sensors 4a and 4b are connected to a control and evaluation unit 5, which, on its part, may be connected to a central vehicle control unit 6 via a bus system, such as a CAN bus. Control and evaluation unit 5 is used for activating distance sensors 4a and 4b, and for evaluating the received measuring signals for determining the distance from possible obstacles, and for transmitting the distance information to an optical or acoustical indicator system, e.g., via the CAN bus and the central control unit 6.

Figure 2:
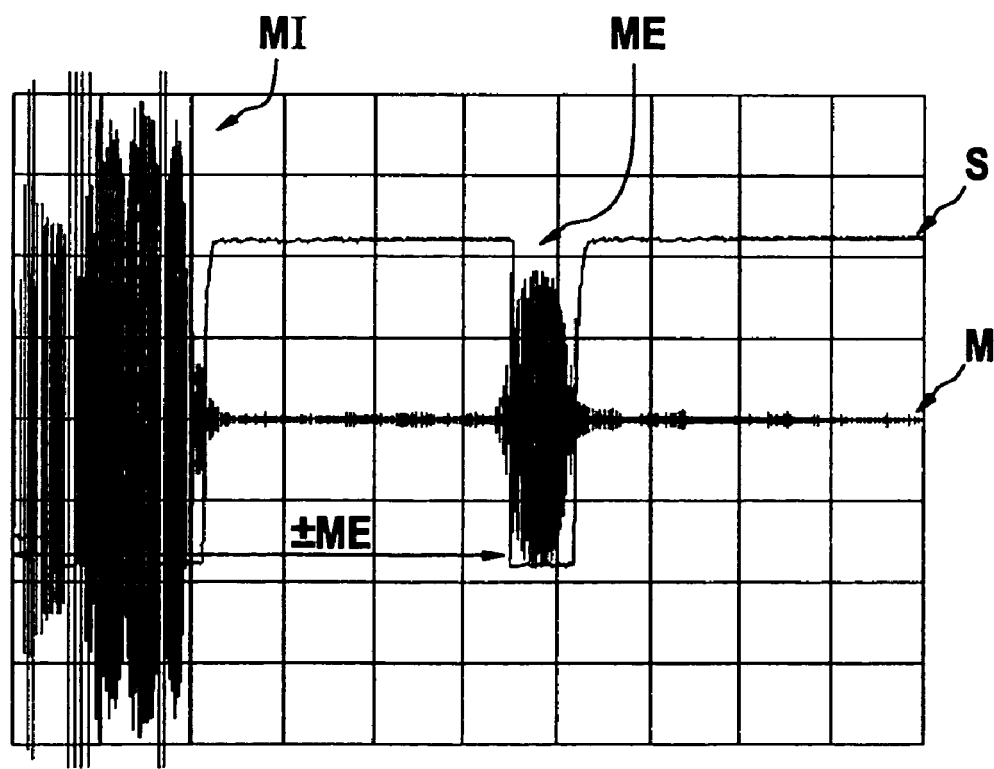
FIG. 2 shows an example chart of a measuring signal of a distance sensor.

In FIG. 2, an example chart of a measuring signal M (having components MI and ME) of an individual distance sensor 4 is shown. In an active emission phase, during which a measuring pulse MI is radiated from the emitter of distance sensor 4, a corresponding measuring pulse signal MI is detected directly in front of the receptor of distance sensor 4. After a running time $t_{ME}$, which is a function of the distance from an obstacle, a measuring pulse echo ME reflected directly from the obstacle is received. On the assumption of a fixed threshold value, the measuring signal M (i.e., components MI and ME) received (or detected) by the receptor of the distance sensor 4 is evaluated in such a way that a switching signal S is generated, which has edge slope lines that are as straight as possible. Then, from the beginning of switching signal S upon receipt of measuring pulse MI and measuring pulse echo ME, the running time $t_{ME}$ and, with the aid of the known signal propagation speed (which is compensated, if necessary, for the vehicle speed), the distance from the obstacle may be ascertained.

Figure 3:
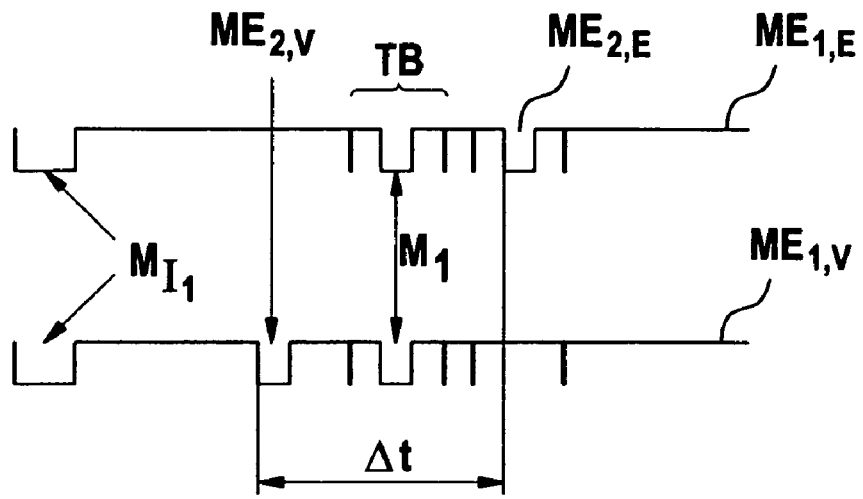
FIG. 3 shows received measuring signal waveforms for the first measurement and the verification measurement having measuring pulses offset in time.
Figure 4:
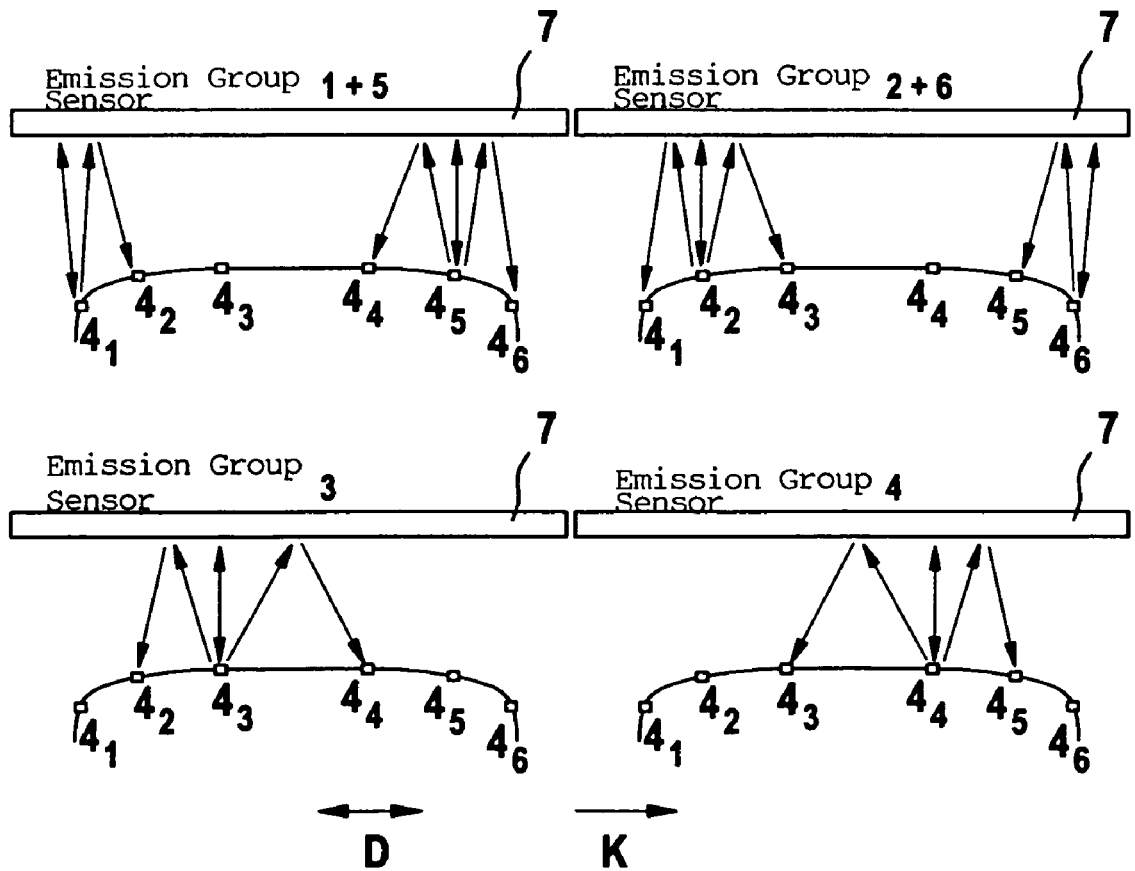
FIG. 4 shows an arrangement for performing a conventional distance measurement, which arrangement includes six distance sensors, with the direct reflection echos and cross reflection echos shown in the figure.

If the receptors of adjacent distance sensors 4 are active at the same time and the emitters of several distance sensors 4 are simultaneously or at least in an overlapping manner emitting measuring pulses MI, in order to enable a unique assignment of measuring pulse echos ME to the corresponding emitting distance sensors 4, the method for distance measurement according to the present invention utilizes a measuring signal $M_E$ for a first measurement and a verification measurement signal $M_V$ for verification, which signals $M_E$ and $M_V$ have time-offset measuring pulses MI, as illustrated in detail in FIG. 3.

The distance measuring method takes place in such a way that measuring pulses $MI_1$ and $MI_2$ are alternatingly emitted, offset in time by a first offset value, by at least two distance sensors 4 of an emitting group of sensors for a first measurement E, i.e., distance sensors 4 of an emitting group radiate their measuring pulses $MI_1$ and $MI_2$ sequentially offset. Measuring pulse echos ME are then received by receptors of distance sensors 4. Subsequently, a repeated emission of measuring pulses MI offset in time by a second offset value takes place for a verification measurement V, the time-offset values for the first measurement E and the verification measurement V being different.

For implementing the above example, the sequence of measuring pulses MI (i.e., $MI_1$ and $MI_2$) emitted by distance sensors 4 during the verification measurement V may be simply selected to be opposite to the sequence of measuring pulses MI emitted during first measurement E.

In the example shown in FIG. 3, a measuring pulse $MI_1$ of the emitter of a first distance sensor 4 (which sensor also detects received measurement signal $M_1$) of an emission group is radiated during both the first measurement and the verification measurement at a substantially same point in time. For the first measurement, measuring pulse $MI_{2,E}$ of a second distance sensor 4 of the emission group is radiated, offset in time, a short while later (e.g., 2 msec) and is received correspondingly later (after cross reflection) by the first distance sensor 4 than the directly reflected measuring pulse echo $ME_1$ of measuring pulse $MI_1$ of received distance sensor 4. Measuring pulse echo $ME_{2,E}$ of measuring pulse $MI_{2,E}$ of the second distance sensor 4 is also received by cross reflection.

For each measuring pulse echo ME, a tolerance of receiving time range (or permissible receiving time range) TB, defined by vertical solid black bars in FIG. 3, is stipulated in connection with respective measuring pulse echo ME.

In a verification measurement V, the offset in time is changed in comparison to the first measurement, for instance, in that measuring pulse $MI_{2,V}$ of the second distance sensor 4 is emitted before measuring pulse $MI_{1,V}$ of the first distance sensor (for instance, 2 msec before). The offset in time ($\Delta t$), in the example shown in FIG. 3, amounts to 4 msec.

Directly reflected measuring pulse echo $ME_1$ may be detected, using the stipulated tolerance of receiving time range TB, by correlation of received measuring signal $M_{1,E}$ derived in the first measurement E and the received measuring signal $M_{1,V}$ obtained in the verification measurement V using a changed offset in time. To do this, it is checked whether, in the receiving time range TB, a measuring pulse echo ME is found in the verification measurement V corresponding to a received measuring pulse echo ME detected in the first measurement E.

The correlation may be made, e.g., by ascertaining the running times of the received measuring pulse echos ME and comparing the running times from measuring signals M emitted from the same distance sensor 4 in the first measurement E and the verification measurement V, and the distance from an obstacle is determined from the running times which agree in the stipulated tolerance of receiving time range TB. An absolute agreement of the running times (i.e., identical running times) is therefore not assumed, but only a comparability within a tolerance stipulated by the receiving time range TB.

In the method according to the present invention, the disadvantages previously described in connection with the conventional measuring methods are eliminated in that distance sensors 4 of a given emission group do not emit simultaneously, but offset in time, and, when it comes to the repeated measurement for verification, distance sensors 4 then emit using a different offset in time. Therefore, the offset in time may amount to only a fraction of the time which a distance sensor 4 requires to make a measurement.

Figure 10:
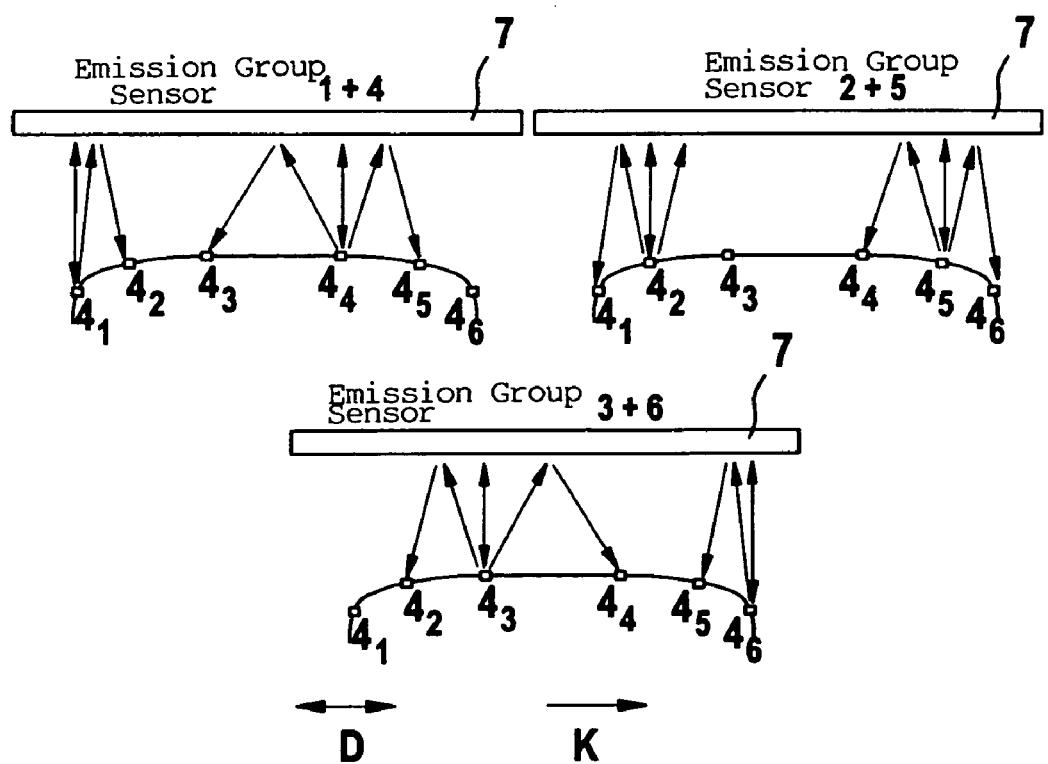
FIG. 10 illustrates subdivision of emission groups for six distance sensors for performing an example embodiment of the method according to the present invention.

FIG. 10 illustrates a division of six distance sensors 4 into three different emission groups in connection with an example embodiment of the method according to the present invention. It becomes clear that, because of the changed offset in time during first measurement E and verification measurement V, the distance between the emission groups that are active at the same time may be reduced. In a first step, distance sensors $4_1$ and $4_4$ of an emission group emit signals, and an obstacle is able to be located exactly from direct reflection echos D and direct cross reflection echos K. Subsequently, distance sensors $4_2$ and $4_5$ are activated as another emission group, and this is followed by the activation of distance sensors $4_3$ and $4_6$ as a further emission group.

Because of the offset in time in the emission of measuring pulses MI by distance sensors 4 of a given emission group, e.g., distance sensors $4_1$ and $4_4$ in the first step, distance sensors $4_2$ and $4_5$ in the second step and distance sensors $4_3$ and $4_6$ in the third step, direct reflection echos D and direct cross reflection echos K may be assigned to the corresponding emitting distance sensors 4 in an unequivocal manner with the aid of stipulated tolerance of receiving time range TB.

Figure 5:
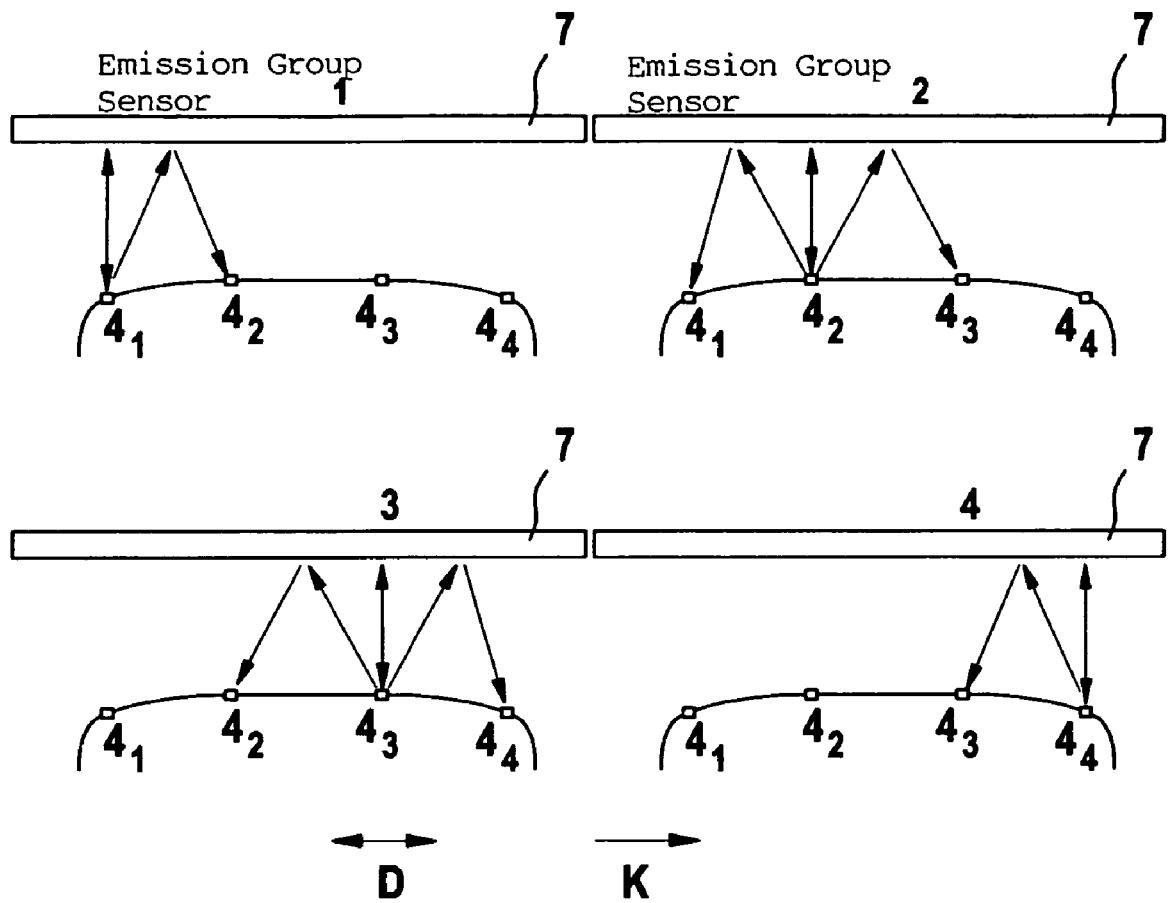
FIG. 5 shows an arrangement for performing a conventional distance measurement, which arrangement includes four distance sensors, with the direct reflection echos and cross reflection echos shown in the figure.
Figure 6:
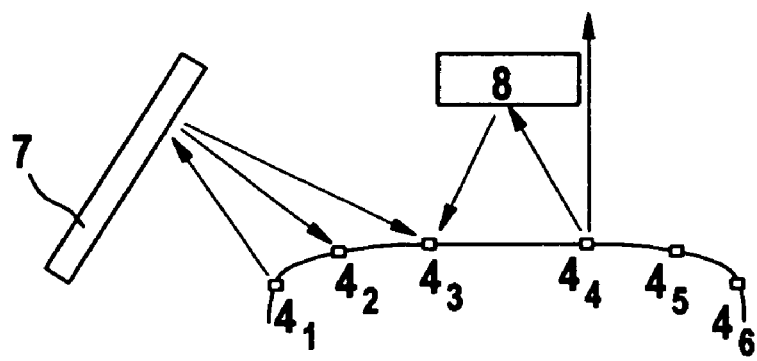
FIG. 6 illustrates an example of a situation in which a false detection of a non-existent obstacle may take place, wherein the false detection of the non-existent obstacle occurs because of cross feed on account of emission groups that are situated next to one another too closely, and the cross feed being evaluated as a cross reflection echo.
Figure 7:
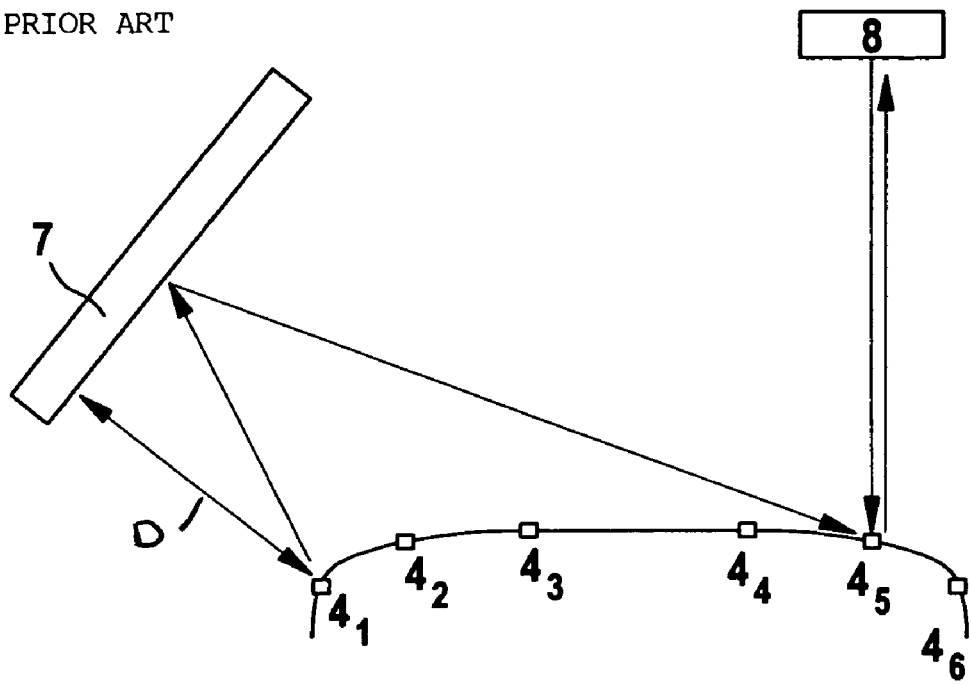
FIG. 7 illustrates an example of a situation in which a false detection of a non-existent obstacle may take place, wherein the false detection of the non-existent obstacle occurs because of cross feed on account of too great a measuring range, and the cross feed being evaluated as a direct reflection echo.
Figure 8:
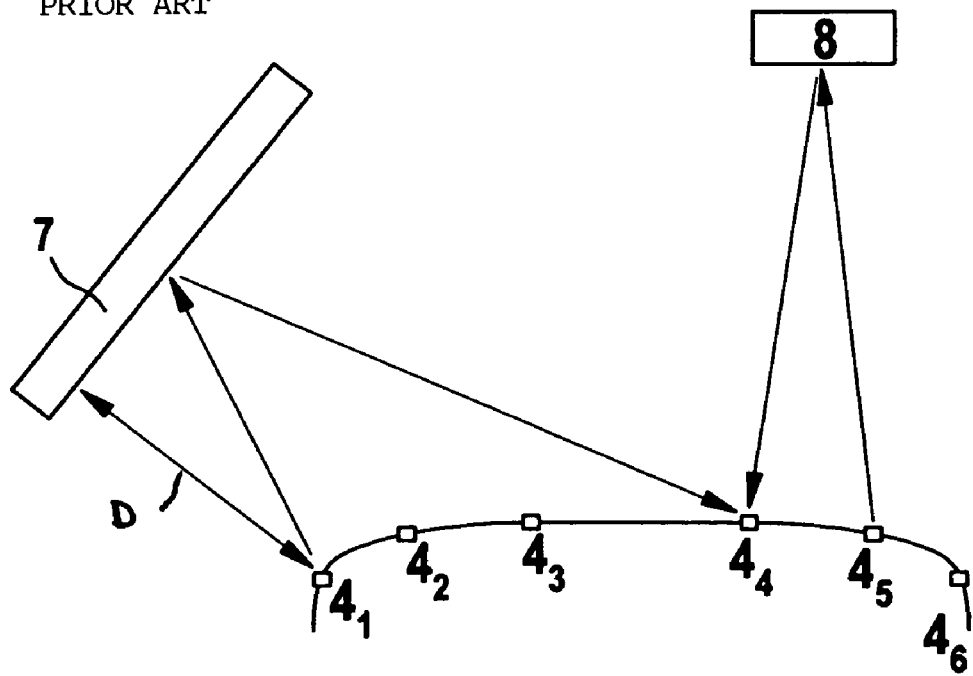
FIG. 8 illustrates an example of a situation in which a false detection of a non-existent obstacle may take place, wherein the false detection of the non-existent obstacle occurs because of cross feed on account of too great a measuring range, and the cross feed being evaluated as a cross reflection echo.
Figure 9:
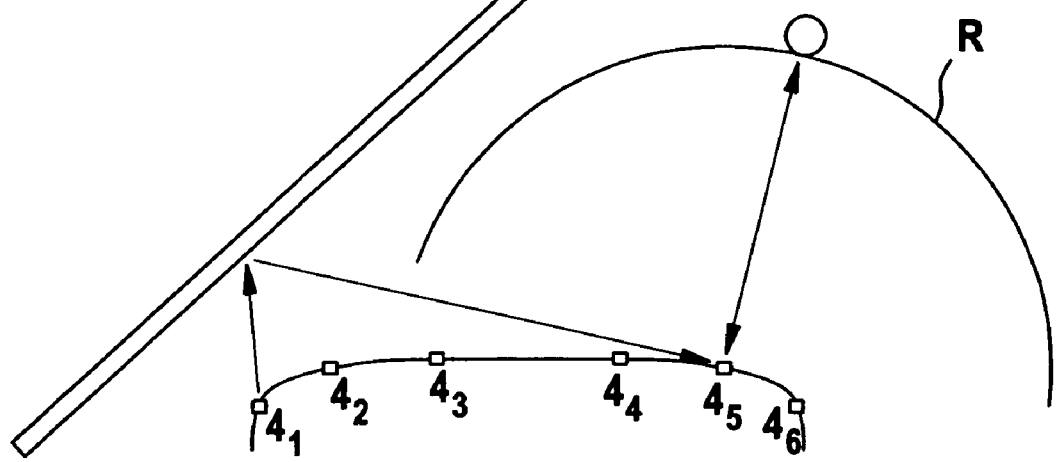
FIG. 9 shows a measuring range of an arrangement of distance sensors at the front end of a motor vehicle.
Figure 11:
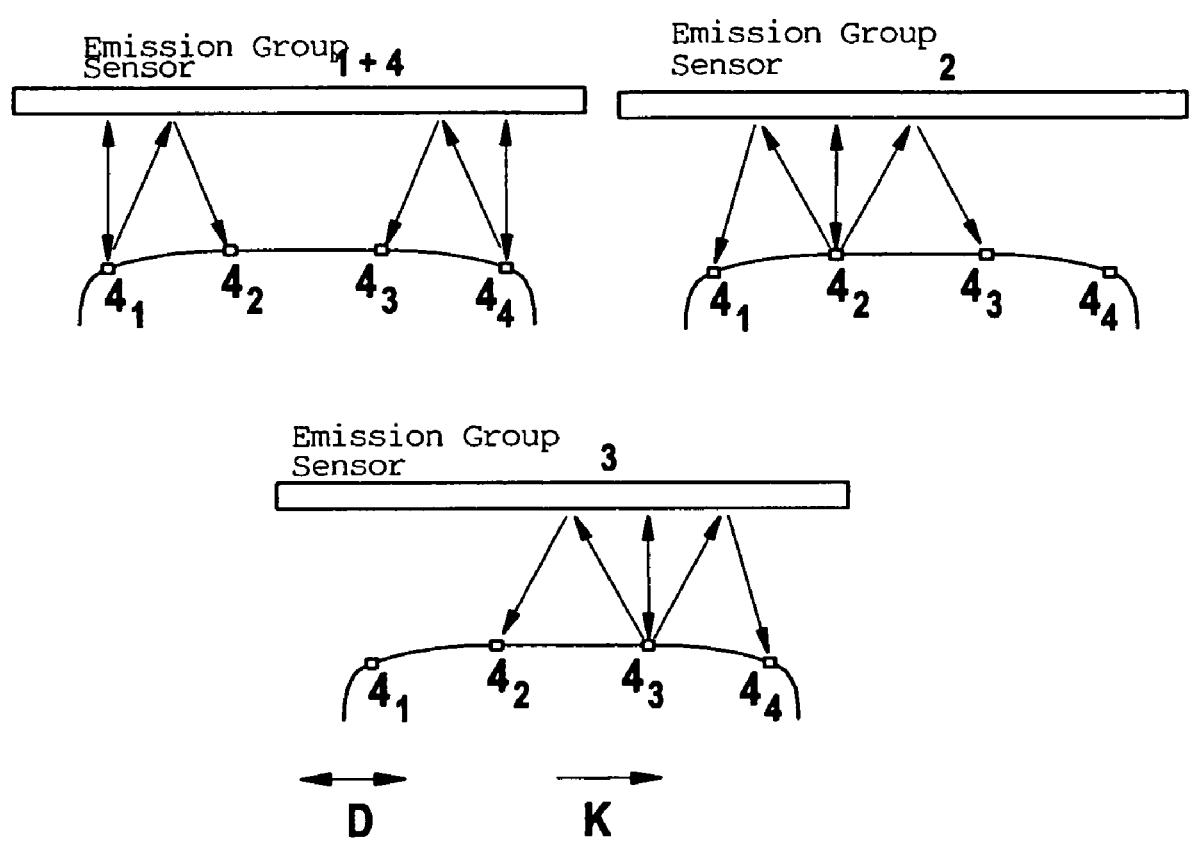
FIG. 11 illustrates subdivision of emission groups for four distance sensors for performing an example embodiment of the method according to the present invention.

Similarly, FIG. 11 illustrates a division of four distance sensors 4 into three different emission groups in connection with an example embodiment of the method according to the present invention. In comparison to FIG. 5, it becomes clear that in the first step shown in FIG. 11, distance sensors $4_1$ and $4_4$ may be activated together in one emission group, the measuring pulses being emitted by distance sensors $4_1$ and $4_4$ using an offset in time with respect to each other. In the subsequent emissions, distance sensors $4_2$ and $4_3$ are activated individually.

What is claimed is:

1. A method for distance measurement using at least two contact-less distance sensors each having one emitter for emitting measuring pulses and one receptor for receiving measuring pulse echos, a distance between a distance sensor and an obstacle that reflects a measuring pulse being determined from a time difference between an emitted measuring pulse and a corresponding received measuring pulse echo, the method comprising:
   alternatingly emitting a first measuring pulse by a first distance sensor and a second measuring pulse by a second distance sensor for a first measurement, the first and second measuring pulses being offset in time by a first offset;
   alternatingly emitting a third measuring pulse by the first distance sensor and a fourth measuring pulse by the second distance sensor for a verification measurement, the third and fourth measuring pulses being offset in time by a second offset different from the first offset;
   receiving, by the first and second distance sensors, measuring pulse echos reflected by an obstacle;
   establishing, for each measuring pulse echo, a tolerance receiving time range for receiving the reflected measuring pulse echo; and
   correlating a measuring pulse echo received in response to the first measurement, and a measuring pulse echo received in response to the verification measurement, to detect if a directly reflected measuring pulse echo is received in response to the verification measurement within the tolerance receiving time range.

2. The method as recited in claim 1, wherein the sequence of the emissions of the third and fourth measuring pulses by the first and second distance sensors during the verification measurement is opposite to the sequence of the emissions of the first and second measuring pulses in the first measurement.

3. The method as recited in claim 2, wherein the second offset in time between the emissions of the third and fourth measuring pulses for the verification measurement is different from the first offset in time for the first measurement.

4. The method as recited in claim 2, wherein at least one of the first offset in time and the second offset in time is selected based on the time duration between the first measurement and the verification measurement.

5. The method as recited in claim 1, wherein the second offset in time between the emissions of the third and fourth measuring pulses for the verification measurement is different from the first offset in time for the first measurement.

6. The method as recited in claim 5, wherein at least one of the first offset in time and the second offset in time is selected based on the time duration between the first measurement and the verification measurement.

7. The method as recited in claim 1, wherein at least one of the first offset in time and the second offset in time is selected based on the time duration between the first measurement and the verification measurement.

8. The method as recited in claim 1, further comprising:
ascertaining running times of the received measuring pulse echos relative to the corresponding first, second, third and fourth measuring pulses;
comparing the ascertained running times of the received measuring pulse echos corresponding to the first and third measuring pulses;
comparing the ascertained running times of the received measuring pulse echos corresponding to the second and fourth measuring pulses; and
determining the distance from an obstacle based on the ascertained running times that fall within a predetermined reception time range.

9. A method for distance measurement using at least two contact-less distance sensors each having one emitter for emitting measuring pulses and one receptor for receiving measuring pulse echos, a distance between a distance sensor and an obstacle that reflects a measuring pulse being determined from a time difference between an emitted measuring pulse and a corresponding received measuring pulse echo, the method comprising:
alternatingly emitting a first measuring pulse by a first distance sensor and a second measuring pulse by a second distance sensor for a first measurement, the first and second measuring pulses being offset in time by a first offset;
alternatingly emitting a third measuring pulse by a first distance sensor and a fourth measuring pulse by a second distance sensor for a verification measurement, the third and fourth measuring pulses being offset in time by a second offset; and
receiving, by the first and second distance sensors, measuring pulse echos reflected by an obstacle,
wherein at least one of the first offset in time and the second offset in time is selected based on the vehicle's speed in such a way that cross-feed cross reflection received by the first and second distance sensors do not fall within a predetermined receiving time range for measuring at least one of direct reflection and direct cross reflection received by the first and second distance sensors, the cross-feed cross reflection resulting from a measuring pulse emitted by a distance sensor that is one of different from and directly adjacent to a distance sensor receiving the cross-feed cross reflection, the direct reflection resulting from a measuring pulse emitted by the distance receiving the direct reflection, and the direct cross reflection resulting from a measuring pulse emitted by a distance sensor that is directly adjacent to the distance sensor receiving the direct cross reflection.

10. The method as recited in claim 9, further comprising:
correlating the first measuring signal and the third measuring signal emitted by the first distance sensor in the first measurement and the verification measurement, respectively, and correlating the second measuring signal and the fourth measuring signal emitted by the second distance sensor in the first measurement and the verification measurement, respectively, for ascertaining at least one of direct reflection and direct cross reflection received by at least one of the first and second distance sensors; and
filtering out cross-feed cross reflection received by at least one of the first and second distance sensors.

11. A method for distance measurement using at least two contact-less distance sensors each having one emitter for emitting, measuring pulses and one receptor for receiving measuring pulse echos, a distance between a distance sensor and an obstacle that reflects a measuring pulse being determined from a time difference between an emitted measuring pulse and a corresponding received measuring pulse echo, the method comprising:
alternatingly emitting a first measuring pulse by a first distance sensor and a second measuring pulse by a second distance sensor for a first measurement, the first and second measuring pulses being offset in time by a first offset;
alternatingly emitting a third measuring pulse by a first distance sensor and a fourth measuring pulse by a second distance sensor for a verification measurement, the third and fourth measuring pulses being offset in time by a second offset; and
receiving, by the first and second distance sensors, measuring pulse echos reflected by an obstacle,
wherein the sequence of the emissions of the third and fourth measuring pulses by the first and second distance sensors during the verification measurement is opposite to the sequence of the emissions of the first and second measuring pulses in the first measurement, and
wherein at least one of the first offset in time and the second offset in time is selected based on the vehicle's speed in such a way that cross-feed cross reflection received by the first and second distance sensors do not fall within a predetermined receiving time range for measuring at least one of direct reflection and direct cross reflection received by the first and second distance sensors, the cross-feed cross reflection resulting from a measuring pulse emitted by a distance sensor that is one of different from and directly adjacent to a distance sensor receiving the cross-feed cross reflection, the direct reflection resulting from a measuring pulse emitted by the distance receiving the direct reflection, and the direct cross reflection resulting from a measuring pulse emitted by a distance sensor that is directly adjacent to the distance sensor receiving the direct cross reflection.

12. The method as recited in claim 11, further comprising:
correlating the first measuring signal and the third measuring signal emitted by the first distance sensor in the first measurement and the verification measurement, respectively, and correlating the second measuring signal and the fourth measuring signal emitted by the second distance sensor in the first measurement and the verification measurement, respectively, for ascertaining at least one of direct reflection and direct cross reflection received by at least one of the first and second distance sensors; and
filtering out cross-feed cross reflection received by at least one of the first and second distance sensors.

13. A method for distance measurement using at least two contact-less distance sensors each having one emitter for emitting measuring pulses and one receptor for receiving measuring pulse echos, a distance between a distance sensor and an obstacle that reflects a measuring pulse being determined from a time difference between an emitted measuring pulse and a corresponding received measuring pulse echo, the method comprising:
alternatingly emitting a first measuring pulse by a first distance sensor and a second measuring pulse by a second distance sensor for a first measurement, the first and second measuring pulses being offset in time by a first offset;

alternatingly emitting a third measuring pulse by a first distance sensor and a fourth measuring pulse by a second distance sensor for a verification measurement, the third and fourth measuring pulses being offset in time by a second offset; and receiving, by the first and second distance sensors, measuring pulse echos reflected by an obstacle, wherein the sequence of the emissions of the third and fourth measuring pulses by the first and second distance sensors during the verification measurement is opposite to the sequence of the emissions of the first and second measuring pulses in the first measurement, and wherein at least one of the first offset in time and the second offset in time is selected based on the vehicle's speed in such a way that cross-feed cross reflection received by the first and second distance sensors do not fall within a predetermined receiving time range for measuring at least one of direct reflection and direct cross reflection received by the first and second distance sensors, the cross-feed cross reflection resulting from a measuring pulse emitted by a distance sensor that is one of different from and directly adjacent to a distance sensor receiving the cross-feed cross reflection, the direct reflection resulting from a measuring pulse emitted by the distance receiving the direct reflection, and the direct cross reflection resulting from a measunng pulse emitted by a distance sensor that is directly adjacent to the distance sensor receiving the direct cross reflection.

14. A measuring system for measuring distance, comprising:

at least a first contact-less distance sensor and a second contact-less distance sensor, each distance sensor having an emitter for emitting measuring pulses and a receptor for receiving measuring pulse echos, a distance between one of the first and second distance sensors and an obstacle that reflects a measuring pulse being determined from a time difference between an emitted measuring pulse and a corresponding received measuring pulse echo;

a control-and-evaluation unit connected to the first and second distance sensors, wherein the control-and-evaluation unit controls the first and second contact-less distance sensors to perform:

alternatingly emitting a first measuring pulse by a first distance sensor and a second measuring pulse by a second distance sensor for a first measurement, the first and second measuring pulses being offset in time by a first offset;

alternatingly emitting a third measuring pulse by the first distance sensor and a fourth measuring pulse by the second distance sensor for a verification measurement, the third and fourth measuring pulses being offset in time by a second offset different from the first offset;

receiving, by the first and second distance sensors, measuring pulse echos reflected by an obstacle;

establishing, for each measuring pulse echo, a tolerance receiving time range for receiving the reflected measuring pulse echo: and correlating a measuring pulse echo received in response to the first measurement, and a measuring pulse echo received in response to the verification measurement, to detect if a directly reflected measuring pulse echo is received in response to the verification measurement within the tolerance receiving time range.

15. A measuring system for measuring distance, comprising:

at least a first contact-less distance sensor and a second contact-less distance sensor, each distance sensor having an emitter for emitting measuring pulses and a receptor for receiving measuring pulse echos, a distance between one of the first and second distance sensors and an obstacle that reflects a measuring pulse being determined from a time difference between an emitted measuring pulse and a corresponding received measuring pulse echo;

a control-and-evaluation unit connected to the first and second distance sensors, wherein the control-and-evaluation unit controls the first and second contact-less distance sensors to perform:

alternatingly emitting a first measuring pulse by a first distance sensor and a second measuring pulse by a second distance sensor for a first measurement, the first and second measuring pulses being offset in time by a first offset;

alternatingly emitting a third measuring pulse by a first distance sensor and a fourth measuring pulse by a second distance sensor for a verification measurement, the third and fourth measuring pulses being offset in time by a second offset; and receiving, by the first and second distance sensors, measuring pulse echos reflected by an obstacle, wherein at least one of the first offset in time and the second offset in time is selected based on the vehicle's speed in such a way that cross-feed cross reflection received by the first and second distance sensors do not fall within a predetermined receiving time range for measuring at least one of direct reflection and direct cross reflection received by the first and second distance sensors, the cross-feed cross reflection resulting from a measuring pulse emitted by a distance sensor that is one of different from and directly adjacent to a distance sensor receiving the cross-feed cross reflection, the direct reflection resulting from a measuring pulse emitted by the distance receiving the direct reflection, and the direct cross reflection resulting from a measuring pulse emitted by a distance sensor that is directly adjacent to the distance sensor receiving the direct cross reflection.

* * * * *